(12) United States Patent
Oh et al.

(10) Patent No.: US 11,970,558 B2
(45) Date of Patent: Apr. 30, 2024

(54) METHOD OF RECOVERING SOLVENT AND SOLVENT RECOVERY APPARATUS

(71) Applicant: LG CHEM, LTD., Seoul (KR)

(72) Inventors: Suk Yung Oh, Daejeon (KR); Jun Seok Ko, Daejeon (KR); Kwan Sik Kim, Daejeon (KR); Joon Ho Shin, Daejeon (KR); Byeong Gil Lyu, Daejeon (KR); Se Kyung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 515 days.

(21) Appl. No.: 17/431,669

(22) PCT Filed: Jan. 15, 2021

(86) PCT No.: PCT/KR2021/000603
§ 371 (c)(1),
(2) Date: Aug. 17, 2021

(87) PCT Pub. No.: WO2022/019418
PCT Pub. Date: Jan. 27, 2022

(65) Prior Publication Data
US 2022/0306790 A1    Sep. 29, 2022

(30) Foreign Application Priority Data

Jul. 22, 2020 (KR) .................. 10-2020-0091151
Dec. 24, 2020 (KR) .................. 10-2020-0183357

(51) Int. Cl.
C08F 236/10    (2006.01)
B01D 3/14    (2006.01)
(Continued)

(52) U.S. Cl.
CPC .............. C08F 236/10 (2013.01); B01D 3/14 (2013.01); B01J 19/06 (2013.01); C08F 212/08 (2013.01)

(58) Field of Classification Search
USPC .......................................................... 528/500
See application file for complete search history.

(56) References Cited

U.S. PATENT DOCUMENTS 4,271,060 A * 6/1981 Hubby .................... C08F 36/04
526/903
4,408,039 A * 10/1983 Irvin ......................... C08C 2/06
528/500
(Continued)

FOREIGN PATENT DOCUMENTS

CA        833659 A        2/1970
CN     101314086 B        6/2010
(Continued)

*Primary Examiner* — Fred M Teskin
(74) *Attorney, Agent, or Firm* — BRYAN CAVE LEIGHTON PAISNER LLP

(57) ABSTRACT

A method of recovering a solvent including: supplying polymerization reactants including one or more monomers and a solvent to a reactor to obtain a polymer solution; supplying a stream including the polymer solution to a separator to separate an upper discharge stream including the solvent, wherein the solvent is in a gaseous phase, and a lower discharge stream including the polymer solution; heating a divergence stream including a part of the lower discharge stream from the separator by a heating device and refluxing the divergence stream to the separator; supplying a residue stream including a remainder of the lower discharge stream from the separator to a steam stripping process unit; and adjusting a vapor mass fraction of the divergence stream which is refluxed to the separator with a pressure adjustment valve after being heated by the heating device.

12 Claims, 2 Drawing Sheets

(51) Int. Cl.
 *B01J 19/06* (2006.01)
 *C08F 212/08* (2006.01)

(56) References Cited

U.S. PATENT DOCUMENTS

| | | |
|---|---|---|
| 6,187,965 B1 | 2/2001 | Bhatt et al. |
| 7,163,989 B2 | 1/2007 | Friedersdorf |
| 9,932,527 B2 | 4/2018 | Gillis et al. |
| 2009/0259005 A1 | 10/2009 | Kiss et al. |

FOREIGN PATENT DOCUMENTS

| | | |
|---|---|---|
| CN | 202089920 | 12/2011 |
| CN | 109790242 | 5/2019 |
| CN | 111234058 | 6/2020 |
| CN | 111234059 | 6/2020 |
| EP | 1712569 A1 | 10/2006 |
| EP | 3000832 A1 | 3/2016 |
| KR | 10-2013-0048519 A | 5/2013 |
| KR | 10-1529977 B1 | 6/2015 |
| KR | 10-2016-0058143 A | 5/2016 |
| KR | 10-2017-0141872 A | 12/2017 |
| KR | 10-2018-0037673 A | 4/2018 |
| WO | 2006008902 A1 | 1/2006 |
| WO | 2016027865 A1 | 2/2016 |
| WO | 2019137383 A1 | 7/2019 |

\* cited by examiner

[FIG. 1]
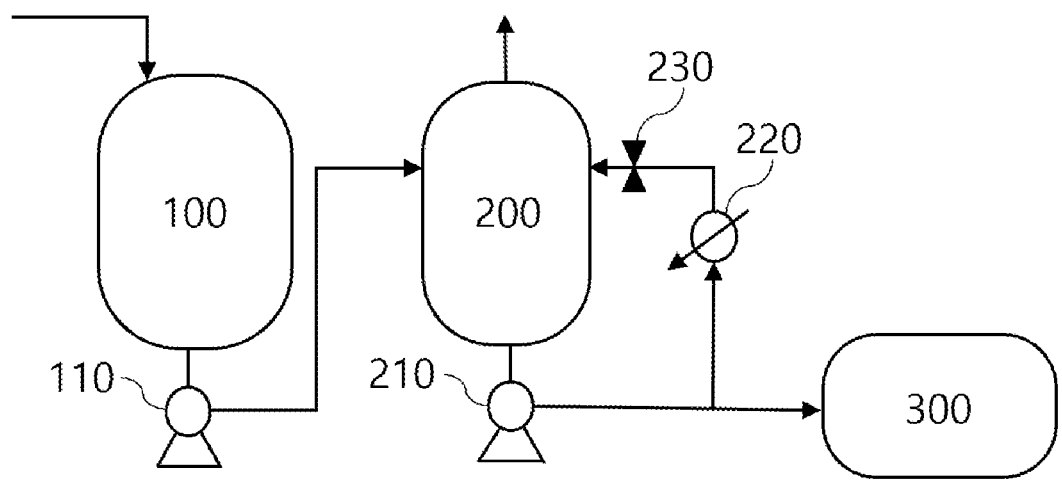
[FIG. 2]
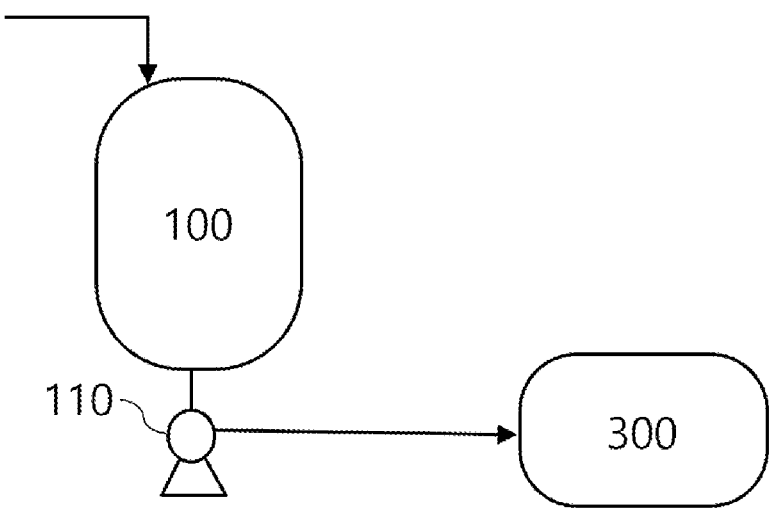

[FIG. 3]
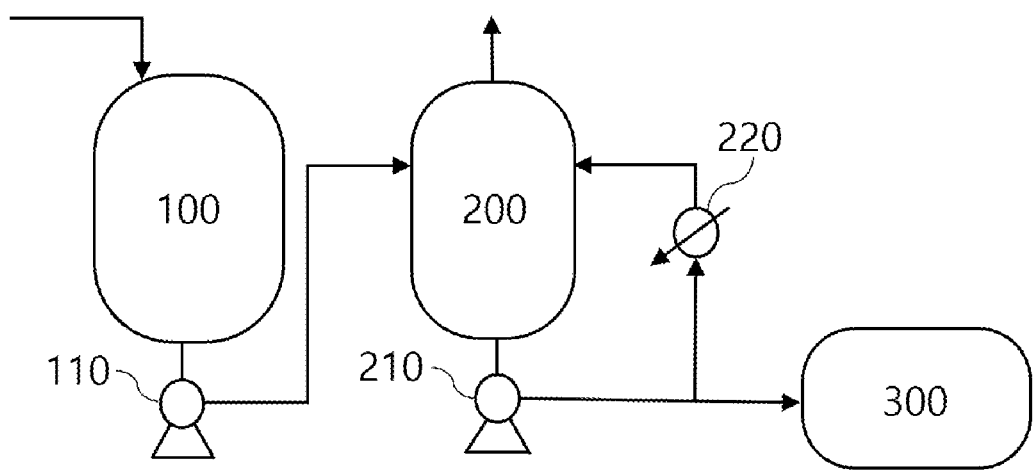

METHOD OF RECOVERING SOLVENT AND SOLVENT RECOVERY APPARATUS

CROSS-REFERENCE TO RELATED APPLICATIONS

This application is a U.S. national stage of international Application No. PCT/KR2021/000603, filed on Jan. 15, 2021, and claims the benefit of priority to Korean Patent Application No. 10-2020-0091151, filed on Jul. 22, 2020, and Korean Patent Application No. 10-2020-0183357, filed on Dec. 24, 2020, the entire contents of which are incorporated herein as a part of the specification.

TECHNICAL FIELD

The present invention relates to a method of recovering a solvent and a solvent recovery apparatus, and more particularly, to a method of recovering a solvent from a polymer solution prepared by solution polymerization and a solvent recovery apparatus.

BACKGROUND

Solution polymerization is a polymerization method, in which a monomer is dissolved in an appropriate solvent to form a solution and the solution is used in radical polymerization and ion polymerization. Preparation of a styrene-butadiene copolymer by an anion polymerization reaction of styrene and butadiene may be included as a representative example of preparing a polymer using solution polymerization. Usually n-butyl lithium is used as an anion polymerization initiator and cyclohexane is used as a solvent.

As such, after anion polymerization is completed, a polymer solution in which a polymer is dissolved or dispersed in a solvent is obtained, and a process of recovering a solvent in the polymer solution as follows is essentially performed to obtain a solid-phase polymer product. After polymerization is completed, the polymerization solution is transferred to a pressure-reduced blowdown tank and a part of the solvent is recovered as gas using residual heat of a polymerization reaction. The polymer solution having a higher polymer composition is transferred to a steam stripping process unit and the solution is brought into direct contact with steam in the steam stripping process unit to recover the solvent as gas, thereby minimizing a residual solvent in the polymer. The polymer obtained in a solid phase through steam stripping is transferred to a manufacturing process with water to obtain a pellet.

However, in the steam stripping process, a large amount of steam is introduced, so that most of the energy is consumed in the polymer preparation process. The amount of steam introduced depends on an amount of the solvent introduced to the steam stripping process unit, and when the amount of steam is insufficient, an amount of the solvent remaining in the polymer is increased, which increases a gas solvent treatment cost of the subsequent manufacturing process and adversely affects a polymer product such as increasing the total volatile organic compounds (tVOC) in the polymer produce.

SUMMARY

An objective of the present invention is to reduce energy used during a polymer preparation process, while minimizing a residual solvent introduced in a manufacturing process to solve the above-discussed problems.

That is, an objective of the present invention is to provide a method of recovering a solvent and a solvent recovery apparatus which volatilizes a solvent in a polymer solution using a separator and a heating device before a steam stripping process of the polymer solution to decrease an amount of steam used in the steam stripping process, thereby reducing energy used during a polymer preparation process while minimizing a residual solvent introduced to a manufacturing process.

In an exemplary embodiment, a method of recovering a solvent includes: supplying polymerization reactants including one or more monomers and a solvent to a reactor to obtain a polymer solution (S10); supplying a stream including the polymer solution to a separator to separate an upper discharge stream including the solvent as a gas phase and a lower discharge stream including the polymer solution (S20); and heating a divergence stream including a part of the lower discharge stream from the separator by a heating device and refluxing the stream to the separator, and supplying a residue stream including a remainder of the lower discharge stream from the separator to a steam stripping process unit (S30), wherein a vapor mass fraction of the divergence stream which is refluxed to the separator after being heated by the heating device is adjusted by a pressure adjustment valve.

In another exemplary embodiment, a solvent recovery apparatus includes: a reactor which is supplied with polymerization reactants including one or more monomers and a solvent and discharges a stream including a polymer solution obtained by polymerization of the polymerization reactants; a separator which is supplied with the stream discharged from the reactor and discharges an upper discharge stream including the solvent as a gas phase and a lower discharge stream including the polymer solution; a heating device which heats a divergence stream including a part of the lower discharge stream from the separator to reflux the stream to the separator; a pressure adjustment valve which adjusts a vapor mass fraction of the divergence stream refluxed to the separator after being heated by the heating device; and a steam stripping process unit which is supplied with a residue stream including a remainder of the lower discharge stream from the separator and volatilizes the solvent in the polymer solution.

The method of recovering a solvent and the solvent recovery apparatus according to the present invention may provide a method of recovering a solvent and a solvent recovery apparatus in which a solvent in a polymer solution is volatilized using a separator and a heating device before a steam stripping process of the polymer solution to decrease an amount of steam used in a steam stripping process, thereby reducing energy used during a polymer preparation process while minimizing a residual solvent introduced to a manufacturing process.

BRIEF DESCRIPTION OF DRAWINGS

FIG. 1 is a process flow chart illustrating a method of recovering a solvent according to an exemplary embodiment of the present invention.

FIG. 2 is a process flow chart illustrating a method of recovering a solvent according to Comparative Example 1 of the present invention.

FIG. 3 is a process flow chart illustrating a method of recovering a solvent according to Comparative Example 2 of the present invention.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, the term "upper portion" means a portion corresponding to a height at or above 50% of the total height of a container or an apparatus, and the term "lower portion" means a portion corresponding to a height less than 50% of the total height of a container or an apparatus.

In the present invention, the term "stream" may refer to a fluid flow in a process, or may refer to a fluid itself flowing in a pipe. Specifically, the "stream" may refer to both a fluid itself flowing in a pipe connecting each apparatus and a fluid flow. In addition, the fluid may refer to a gas or a liquid.

Hereinafter, the present invention will be described in more detail with reference to FIG. 1 for better understanding of the present invention.

According to an exemplary embodiment of the present invention, a method of recovering a solvent is provided. The method of recovering a solvent includes: supplying polymerization reactants including one or more monomers and a solvent to a reactor 100 to obtain a polymer solution (S10); supplying a stream including the polymer solution to a separator 200 to separate an upper discharge stream including the solvent as a gas phase and a lower discharge stream including the polymer solution (S20); and heating a divergence stream including a part of the lower discharge stream from the separator 200 by a heating device 220 and refluxing the stream to the separator 200, and supplying a residue stream including a remainder of the lower discharge stream from the separator to a steam stripping process unit 300 (S30), wherein a vapor mass fraction of the divergence stream which is refluxed to the separator 200 after being heated by the heating device 220 may be adjusted by a pressure adjustment valve 230.

According to an exemplary embodiment of the present invention, S10 may be a step of supplying polymerization reactants including one or more monomers and a solvent to a reactor 100 to obtain a polymer solution including a polymer formed by a polymerization reaction of the one or more monomers in the solvent. The thus-obtained polymer solution may be subjected to steps of recovering the solvent described later for manufacture, thereby obtaining a solid-phase polymer.

The one or more monomers may include an aromatic vinyl-based monomer including one or more selected from the group consisting of styrene, alpha-methylstyrene, 3-methyl styrene, 4-methyl styrene, 4-propyl styrene, isopropenylnaphthalene, 1-vinylnaphthalene, styrene substituted with an alkyl group having 1 to 3 carbon atoms, 4-cyclohexylstyrene, 4-(p-methylphenyl)styrene, and styrene substituted with a halogen; and a conjugated diene-based monomer including one or more selected from the group consisting of 1,3-butadiene, 1,4-butadiene, 2,3-dimethyl-1,3-butadiene, 2-ethyl-1,3-butadiene, 1,3-pentadiene, piperylene, 3-butyl-1,3-octadiene, 2-phenyl-1,3-butadiene, and isoprene. As an example, the one or more monomers may include styrene and butadiene, and thus, a polymer produced by the polymerization reaction may be a styrene-butadiene copolymer.

The solvent may include one or more selected from the group consisting of cyclohexane, N,N-dimethylformamide, N,N-dimethylacetamide, N-methyl-2-pyrrolidone, N-cyclohexyl-2-pyrrolidone, N-methyl-ε-caprolactam, 1,3-dialkyl-2-imidazolidinone, tetramethylurea, and hexamethylphosphoric triamide. As an example, the organic solvent may include cyclohexane. In this case, polymerization of the styrene-butadiene copolymer may be easily performed.

The polymerization reaction may be performed by further including an additive such as ion exchange water, an initiator, a molecular weight modifier, an activator, and an oxidation-reduction catalyst.

The initiator may include, for example, one or more selected from the group consisting of t-butyl lithium, diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoylperoxide, dibenzoyl peroxide, 3,5,5-trimethylhexanol peroxide, and t-butylperoxy isobutylate.

As the molecular weight modifier, for example, one or more selected from the group consisting of alpha-methylstyrene dimer, t-dodecylmercaptan, n-dodecylmercaptan, octylmercaptan, carbon tetrachloride, methylene chloride, methylene bromide, tetramethyl diuram disulfide, dipentamethylene diuram doisulfide, and diisopropylxanthogen disulfide may be used.

As the activator, one or more selected from the group consisting of sodium hydrosulfite, sodium formaldehyde sulfoxylate, sodium ethylenediamine tetraacetate, ferrous sulfate, lactose, dextrose, sodium linolenate, and sodium sulfate may be used.

As the oxidation-reduction catalyst, one or more selected from the group consisting of sodium formaldehyde sulfoxylate, ferrous sulfate, disodium ethylenediamine tetraacetate, and cupric sulfate may be used.

The additive is not limited to those described above, and commonly used additives for a polymerization reaction may be further used. As a specific example, n-butyl lithium may be used as the initiator. In this case, polymerization of the styrene-butadiene copolymer may be easily performed.

According to an exemplary embodiment of the present invention, an additive such as an activator, a chelating agent, a dispersing agent, a pH modifier, a deoxidizing agent, a particle diameter regulator, an anti-aging agent, an antioxidant, an antifoaming agent, and an oxygen scavenger may be further introduced, if necessary, in addition to the composition, within a range which does not deteriorate the physical properties of the copolymer.

According to an exemplary embodiment of the present invention, after S10 and before S20 as described herein, a step of supplying the polymer solution to a blow down tank (not shown) and discharging the solvent as a gas phase using a residual heat of the polymerization reaction may be further included. Since the residual heat of the polymerization reaction remains in the polymer solution supplied to the blow down tank (not shown), the solvent in the polymer solution may be recovered in a gas phase under a reduced pressure condition to which a separate steam is not supplied in the blow down tank (not shown). The recovered solvent is supplied to a purification unit (not shown), and the polymer solution, from which the solvent is partly removed, is discharged to a lower portion and may be subjected to the following steps described later for further recovery of the solvent.

A conventional method includes obtaining a solid-phase polymer by directly supplying the polymer solution, from which the solvent is partly removed, discharged from the blow down tank (not shown) to the steam stripping process unit 300, and recovering the solvent in contact with the steam as a gas phase. However, in this case, a large amount of steam is introduced to the steam stripping process unit 300, which results in high energy consumption. The amount of steam introduced to the steam stripping process unit 300 depends on an amount of the solvent in the polymer solution introduced to the steam stripping process unit 300, and when the amount of the steam introduced is insufficient, an amount of the solvent remaining in the solid-phase polymer increases, which increases the cost of treatment in a gas phase of the solvent in a subsequent manufacturing process unit and a polymer product is adversely affected, such as an increase of total volatile organic compounds (tVOC) in the polymer product.

Accordingly, in the present invention, the solvent in the polymer solution may be volatilized using a separator 200 and a heating device 220 before a steam stripping process of the polymer solution, thereby minimizing a residual solvent introduced to the subsequent manufacturing process and decreasing the amount of steam used in the steam stripping process unit 300. Thus, energy used during a polymer preparation process is reduced in this method of recovering a solvent.

That is, according to the present invention, the discharge stream from the reactor 100 may be supplied to the separator 200, or the discharge stream from the reactor 100 may be passed through the blow down tank (not shown) and then supplied to the separator 200. Specifically, in the present invention, S20 and S30 may be performed after S10.

According to an exemplary embodiment of the present invention, S20 may be a step of supplying the discharge stream from the reactor 100 including the polymer solution to the separator 200 to separate an upper discharge stream including the solvent in a gas phase and a lower discharge stream including the polymer solution. As such, the polymer solution included in the discharge stream from the reactor 100 may be discharged as the polymer solution having an increased concentration of the polymer in the lower discharge stream while passing through the separator 200.

According to an exemplary embodiment of the present invention, S30 is a step of supplying the lower discharge stream from the separator 200 to the steam stripping process unit 300, and includes heating a divergence stream including a part of the lower discharge stream from the separator 200 by the heating device 220 and then refluxing the stream to the separator 200, and supplying a residue stream including a remainder of the lower discharge stream from the separator 200 to the steam stripping process unit 300. Here, a vapor mass fraction of the divergence stream, which is heated by the heating device 220 and then refluxed to the separator 200, may be adjusted by the pressure adjustment valve 230. Specifically, the pressure adjustment valve 230 may serve to adjust the vapor mass fraction of the divergence stream until the divergence stream diverging from a part of the lower discharge stream is heated by the heating device 220 and then refluxed to the separator 200. Here, the vapor mass fraction may refer to a weight ratio of vapor to a liquid and vapor in stream including the liquid and the vapor. That is, the vapor mass fraction of the divergence stream after being heated by the heating device 220 and, until being refluxed to the separator 200, may be adjusted by adjusting an open and close degree of the pressure adjustment valve 230.

More specifically, the pressure adjustment valve 230 may adjust the vapor mass fraction of the divergence stream after the divergence stream is heated by the heating device 220 and before the divergence stream passes through the pressure adjustment valve 230. That is, a weight ratio of vapor to a liquid and the vapor in the divergence stream after the divergence stream is heated by the heating device 220 and before the divergence stream passes through the pressure adjustment valve 230 may be adjusted. Here, the vapor mass fraction of the divergence stream after the divergence stream is heated by the heating device 220 and before the divergence stream passes through the pressure adjustment valve 230 may be adjusted to 0 wt % to 5 wt %, 0 wt % to 2 wt %, or 0 wt % by the pressure adjustment valve 230. Within the vapor mass fraction range, since the divergence stream having an adjusted vapor mass fraction is present in a liquid state including a minimal amount of gas, the divergence stream may have excellent heat transfer efficiency to improve a solvent volatilization ability of the separator 200, and a fouling phenomenon in which the divergence stream is vaporized to block the heating device 220 may also be prevented.

In addition, the heating device 220, which heats the divergence stream of the separator 200, may be a heat exchanger, that is, a reboiler.

As a heat source used in the heating device 220, a high-temperature steam may be used, and the divergence stream of the separator 200 may be heated by obtaining heat from the steam. Here, the separator does not have a solvent volatilization function, and because the stream heated by being passed through the heating device 220 is refluxed into the separator 200, the solvent may be volatilized by raising a temperature of the polymer solution present in the separator 200. Inside piping and the separator 200, after the stream is passed through the pressure adjustment valve 230, the vapor mass fraction of the divergence stream tends to increase. As such, the divergence stream having an increased vapor mass fraction may be sprayed into the separator 200 while being refluxed into the separator 200, and thus, heat may be evenly transferred to the polymer solution present inside the separator 200.

The volatilized solvent is recovered and supplied to a purification unit (not shown) and the polymer solution having an increased polymer concentration may be discharged to the lower portion and subjected to the following subsequent step for further recovery of the solvent.

According to an exemplary embodiment of the present invention, in S30, a flow rate ratio of the divergence stream, which diverges from the lower discharge stream from the separator and is refluxed to the separator, with respect to a total flow rate of the lower discharge stream from the separator 200 may be 80% to 90%.

When the flow rate ratio of the divergence stream is 80% or more, an amount of the solvent remaining in the stream introduced to the subsequent steam stripping process unit 300 may be minimized, thereby obtaining a finally obtained solid-phase polymer product having high purity. Meanwhile, when the flow rate ratio of the divergence stream is 90% or less, a temperature of the stream refluxed to the separator 200 is prevented from being excessively lowered, that is, the amount of steam required in the heating device 220 may be prevented from being excessive. Accordingly, since the volatilization of the solvent in the polymer solution present in the separator 200 is easily performed, the amount of steam consumed in the subsequent steam stripping process unit 300 may be decreased, and an amount of the divergence stream is prevented from being excessively introduced to and discharged from the separator 200. Thus, a fouling phenomenon in the piping due to hydraulic instability and a differential pressure increase is prevented.

For example, the ratio may be 80% to 95%, 80% to 90%, 85% to 90%, or 88% to 90%. When cyclohexane is used as the solvent and a phenol-based, sulfur-based, or phosphorus-based antioxidant is used as the additive during the polymerization, the temperature of the divergence stream passing the heating device 220 and being refluxed to the separator 200 is prevented from being excessively lowered within the range. Thus, the function of the antioxidant in the solvent may be easily exhibited. Accordingly, a color change of the finally obtained solid-phase polymer may be prevented to obtain a product having high quality and high purity.

As an example, the antioxidant may be one or more selected from the group consisting of butylated hydroxyl toluene, tris(nonylphenyl)phosphite, N,N-1,6-hexanediylbis [3,5-bis(1,1-dimethylethyl)-4-hydoxyphenylpropanaimd], and (octadecyl-3-[3,5-di-tert-butyl-4-hydroxyphenyl]propionate).

According to an exemplary embodiment of the present invention, in S30, a polymer concentration of the polymer solution in the lower discharge stream from the separator 200 supplied to the steam stripping process unit 300 may be 20 wt % to 40 wt %, 30 wt % to 40 wt %, or 35 wt % to 40 wt %. That is, the polymer concentration of the polymer solution in the residue stream from the separator 200 supplied to the steam stripping process unit 300 may be 20 wt % to 40 wt %, 30 wt % to 40 wt %, or 35 wt % to 40 wt %.

When the polymer concentration of the polymer solution is 20 wt % or more, the amount of the solvent of the polymer solution in the stream supplied to the steam stripping process unit may be minimized to obtain the finally obtained solid-phase polymer product having a high purity and decrease the amount of steam consumed in the subsequent steam stripping process unit 300. Meanwhile, when the polymer concentration of the polymer solution is 40 wt % or less, the fouling phenomenon by polymer precipitation in the piping connecting the heating device 220 and the separator 200 and the steam stripping process unit 300 may be prevented, thereby achieving excellent heat exchange efficiency and solvent recovery efficiency.

As an example, a ratio of a flow rate of the steam supplied to the heating device 220 to a flow rate of the solvent included in the polymer solution in the discharge stream from the reactor 100 (a lower discharge stream from the blow down tank when being passed through the blow down tank) may be 0.005 to 0.110, 0.017 to 0.110, or 0.052 to 0.110. Within this range, the polymer concentration of the polymer solution may be easily adjusted to the range described above.

According to an exemplary embodiment of the present invention, in S30, a viscosity of the polymer solution in the lower discharge stream from the separator 200 supplied to the steam stripping process unit 300 may be 1,000 cp to 10,000 cp, 1,000 cp to 8,000 cp, or 1,000 cp to 5,000 cp. That is, the viscosity of the polymer solution in the residue stream of the separator supplied to the steam stripping process unit may be 1,000 cp to 10,000 cp, 1,000 cp to 8,000 cp, or 1,000 cp to 5,000 cp.

When the viscosity of the polymer solution is 1,000 cp or more, an amount of the solvent of the polymer solution in the stream supplied to the steam stripping process unit may be minimized to obtain the solid-phase polymer product having high purity and decrease the amount of steam consumed in the subsequent steam stripping process unit 300. Meanwhile, when the viscosity of the polymer solution is 10,000 cp or less, the fouling phenomenon by polymer accumulation in the piping connecting the heating device 220 and the separator 200 and the steam stripping process unit 300 may be prevented, so that operation shut down of the separator 200 may be prevented.

For example, when the viscosity of the polymer solution in the discharge stream from the reactor 100 is 100 cp to 1,000 cp, the polymer concentration of the polymer solution in the lower discharge stream discharged from a lower portion of the separator 200 after the solvent is volatilized in the separator 200 may be 20 wt % to 40 wt %, while the viscosity of the polymer solution is 1,000 cp to 10,000 cp. Here, assuming that a steady state is maintained inside the separator 200, the polymer concentrations and the viscosities of the polymer solution contained inside the separator 200 and the polymer solution included in the lower discharge stream from the separator 200 may be the same.

Meanwhile, for example, if the stream including the polymer solution discharged from the reactor 100 is not supplied to the separator 200 according to the present invention but supplied to a common distillation tower, it may not be easy to discharge the polymer solution having the polymer concentration and viscosity in the range described above. Even in the case in which the polymer solution having the polymer concentration and viscosity in the range described above is intended to be discharged by solvent volatilization using the distillation tower, the fouling phenomenon due to polymer precipitation or accumulation occurs by a complicated internal structure of the common distillation tower provided with a tray or packed bed, so that the polymer solution may not flow well and a residence time may be locally different to deteriorate heat transfer efficiency. Accordingly, the physical properties of the polymer in the discharged polymer solution may be negatively affected.

As such, when the stream including the polymer solution discharged from the reactor 100 is supplied to the common distillation tower, not the separator 200 according to the present invention, to volatilize the solvent in the polymer solution, various problems may be caused by the fouling phenomenon due to polymer precipitation or accumulation by the complicated internal structure of the distillation tower as described above. Thus, when the lower discharge stream from the distillation tower is refluxed, the same or similar effect as the present invention may not be exhibited, even in the case of adjusting the vapor mass fraction of the lower discharge stream refluxed using the pressure adjustment valve 230.

According to an exemplary embodiment of the present invention, in S30, a temperature of the divergence stream which is heated by the heating device 220 and refluxed to the separator 200 may be 80° C. to 110° C.

When the temperature of the refluxed stream is 80° C. or higher, the temperature of the divergence stream refluxed to the separator 200 is prevented from being excessively lowered to allow the volatilization of the solvent in the polymer solution present in the separator 200 to be easily performed, thereby decreasing the amount of steam consumed in the subsequent steam stripping process unit 300. Meanwhile, when the temperature of the refluxed divergence stream is 110° C. or lower, an amount of a residual solvent in the stream introduced to the subsequent steam stripping process unit 300 may be minimized, thereby obtaining the finally obtained solid-phase polymer product having high purity.

For example, the temperature of the refluxed divergence stream may be 80° C. to 110° C., 85° C. to 105° C., or 90° C. to 100° C. When cyclohexane is used as the solvent and a phenol-based, sulfur-based, or phosphorus-based antioxidant is used as the additive during the polymerization, the temperature of the divergence stream passing the heating device 220 and being refluxed to the separator 200 is prevented from being excessively lowered within the range. Thus, the function of the antioxidant in the solvent may be easily exhibited. Accordingly, a color change of the finally obtained solid-phase polymer may be prevented to obtain a product having high quality and high purity.

According to an exemplary embodiment of the present invention, after S30, volatilizing the solvent from the residue stream of the separator 200 supplied to the steam stripping process unit 300 to obtain a solid-phase polymer (S40) may be further included. As described above, in the present invention, before the discharge stream from the reactor 100 is supplied to the stripping process unit 300, the discharge stream from the reactor 100 is passed through the separator 200 and the heating device 220 to volatilize the solvent in the polymer solution, thereby decreasing the amount of steam used in the steam stripping process unit 300, and reducing an amount of total energy used in the process. The solvent which is volatilized and recovered in the stripping process unit 300 is supplied to a purification unit (not shown) and a stream including the solid-phase polymer is discharged to the lower portion and may be subjected to the following subsequent step for further recovery of the solvent.

According to an exemplary embodiment of the present invention, the method of recovering a solvent according to the present invention may further include introducing the lower discharge stream from the steam stripping process unit 300 including the solid-phase polymer to a dryer in the manufacturing process to discharge a residual solvent (S50). As an example, in the steam stripping process unit 300, circulation water (water) for transferring the solid-phase polymer is circulated, and the lower discharge stream and the circulation water from the steam stripping process unit 300 including the solid-phase polymer may be introduced to the dryer in the manufacturing process to discharge and discard the residual solvent and moisture as a waste gas and obtain a final solid-phase polymer product.

According to an exemplary embodiment of the present invention, a solvent recovery apparatus is provided. The solvent recovery apparatus may include: a reactor 100 which is supplied with polymerization reactants including one or more monomers and a solvent and discharges a stream including a polymer solution obtained by polymerization of the polymerization reactants; a separator 200 which is supplied with the stream discharged from the reactor and discharges an upper discharge stream including the solvent as a gas phase and a lower discharge stream including the polymer solution; a heating device 220 which heats a divergence stream including a part of the lower discharge stream from the separator 200 to reflux the stream to the separator 200; a pressure adjustment valve 230 which adjusts a vapor mass fraction of the divergence stream refluxed to the separator after being heated by the heating device; and a steam stripping process unit 300 which is supplied with a residue stream including a remainder of the lower discharge stream from the separator 200 and volatilizes the solvent in the polymer solution.

According to an exemplary embodiment of the present invention, the solvent recovery apparatus may be an apparatus for performing a process according to the method of recovering a solvent described herein.

According to an exemplary embodiment of the present invention, the solvent recovery apparatus may be described with reference to FIG. 1. Specifically, the solvent recovery apparatus may include the reactor 100, the separator 200, the heating device 220, the pressure adjustment valve 230, and the steam stripping process unit 300.

According to an exemplary embodiment of the present invention, the reactor 100 may be supplied with the polymerization reactants including one or more monomers and a solvent to obtain the polymer solution including a polymer formed by a polymerization reaction of the one or more monomers in the solvent.

The kinds of one or more monomers and solvents may be the same as those used in the method of recovering a solvent described herein.

The polymerization reaction may be performed by further including ion exchange water, an initiator, a molecular weight modifier, an activator, an oxidation-reduction catalyst, and other additional additives. The kind of additive may be the same as the kind of additive used in the method of recovering a solvent described above.

According to an exemplary embodiment of the present invention, the solvent recovery apparatus according to the present invention may further include a blow down tank (not shown) which is supplied with the discharge stream from the reactor 100, discharges the solvent as a gas phase using residual heat of the polymerization reaction, and discharges the lower discharge stream including the polymer solution to the separator 200. Since the residual heat of the polymerization reaction remains in the polymer solution supplied to the blow down tank (not shown), the solvent in the polymer solution may be recovered in a gas phase under a reduced pressure condition to which a separate steam is not supplied in the blow down tank (not shown). The recovered solvent is supplied to a purification unit (not shown), and the polymer solution, from which the solvent is partly removed, is discharged to the lower portion and may be supplied to an apparatus for further recovery of a solvent.

That is, according to the present invention, the discharge stream from the reactor 100 may be supplied to the separator 200, or the discharge stream from the reactor 100 may be passed through the blow down tank (not shown) and then supplied to the separator 200.

According to an exemplary embodiment of the present invention, the separator 200 may be supplied with the discharge stream from the reactor, and discharge the upper discharge stream including the solvent as a gas phase and the lower discharge stream including the polymer solution. As such, the polymer solution included in the discharge stream from the reactor 100 may be discharged as the polymer solution having an increased concentration of the polymer in the lower discharge stream while passing through the separator 200.

According to an exemplary embodiment of the present invention, the heating device 220 may heat a divergence stream including a part of the lower discharge stream from the separator 200 to reflux the stream to the separator. Specifically, in the course of supplying the lower discharge stream from the separator 200 to the subsequent steam stripping process unit 300, a part of the lower discharge stream from the separator 200 may diverge, be heated by the heating device 220, and then be refluxed to the separator, and the residue stream including a residue of the lower discharge stream from the separator may be supplied to the steam stripping process unit 300. Here, the heating device 220 may be a heat exchanger, that is, a reboiler.

As a heat source used in the heating device 220, a high-temperature steam may be used, and the divergence stream of the lower discharge stream from the separator 200 may be heated by obtaining heat from the steam. Consequently, the divergence stream diverging from the lower discharge stream from the separator 200 may be passed through the heating device 220 and refluxed to the separator 200 in a heated state, thereby volatilizing the solvent contained in the polymer solution inside the separator 200.

The divergence stream which is heated by the heating device and then refluxed to the separator 200 may have a vapor mass fraction adjusted by the pressure adjustment valve 230. Specifically, the pressure adjustment valve 230 may serve to adjust the vapor mass fraction of the divergence stream after the divergence stream diverging from a part of the lower discharge stream from the separator 200 is heated by the heating device 220 and before the divergence stream passes through the pressure adjustment valve 230.

According to an exemplary embodiment of the present invention, the steam stripping process unit 300 may be supplied to the residue stream including the remainder of the lower discharge stream from the separator 200 and volatilize the solvent in the polymer solution, thereby obtaining a solid-phase polymer. As described herein, in the present invention, before the discharge stream from the reactor 100 is supplied to the stripping process unit 300, the discharge stream from the reactor 100 may be passed through the separator 200 and the heating device 220 to volatilize the solvent, thereby decreasing the amount of steam used in the steam stripping process unit 300. Thus, the amount of total energy used in the process is reduced.

According to an exemplary embodiment of the present invention, the solvent recovery apparatus according to the present invention may include a dryer (not shown) which is supplied with the lower discharge stream from the steam stripping process unit 300 including the solid-phase polymer and discharges the residual solvent. The dryer (not shown) may be included in the manufacturing process (not shown). As a specific example, in the steam stripping process unit 300, circulation water (water) for transferring the solid-phase polymer is circulated, and the discharge stream and the circulation water from the steam stripping process unit 300 including the solid-phase polymer may be introduced to the dryer in the manufacturing process to discharge and discard the residual solvent and moisture as a waste gas and obtain a final solid-phase polymer product.

According to an exemplary embodiment of the present invention, the solvent recovery apparatus according to the present invention may be provided with the reactor 100, the blow down tank (not shown), the separator 200, the heating device 220, the pressure adjustment valve 230, the steam stripping process unit 300, and the piping connecting the dryer (not shown) in the manufacturing process, and in order to easily supply the lower discharge stream from each configuration to the configuration of the subsequent device, a pump 110 or 210 may be further provided on the piping.

According to an exemplary embodiment of the present invention, the solvent recovery apparatus according to the present invention may include at least one or more of the separator 200, the pump 210, the heating device 220, and the pressure adjustment valve 230.

According to an exemplary embodiment of the present invention, in the method of recovering a solvent and the solvent recovery apparatus according to the present invention, a distillation column (not shown), a condenser (not shown), a reboiler (not shown), a pump (not shown), a compressor (not shown), a mixer (not shown), a separating device (not shown) and the like may be further installed, if necessary.

Hereinabove, the method of recovering a solvent and the solvent recovery apparatus according to the present invention have been described and illustrated in the drawings, but the description and the illustration in the drawings are the description and the illustration of only core constitutions for understanding of the present invention, and in addition to the process and apparatus described above and illustrated in the drawings, the process and the apparatus which are not described and illustrated separately may be appropriately applied and used for carrying out the method of recovering a solvent and the solvent recovery apparatus according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

As shown in the process flow chart illustrated in FIG. 1, a styrene monomer, a butadiene monomer, cyclohexane as a solvent, and n-butyllithium as an initiator were supplied to a reactor 100 including a stirrer and a jacket and were polymerized to obtain a polymer solution in which polymerization was completed. Here, a polymer concentration in the polymer solution was 20 wt % (5 tons of a polymer and 20 tons of the solvent). Then, a blow down tank (not shown) was supplied with a stream including the polymer solution from the reactor 100 to recover a part of the solvent as a gas phase under a reduced pressure using residual heat remaining the polymer solution and discharge the polymer solution from which the solvent was partly removed. Here, an amount of the part of the solvent recovered as a gas phase was 2.8 tons and a concentration of the polymer solution, from which the solvent was partly removed, was 22.5 wt %. Then, the stream including the polymer solution, from which the solvent was partly removed, was transferred from the blow down tank (not shown) to a separator 200 connected by a pump (not shown) in a discharge line to further volatilize the solvent to obtain the polymer solution having an increased polymer concentration. Here, further volatilization of the solvent in the separator 200 was performed by heating a divergence stream including 80% of a lower discharge stream from the separator 200 including the polymer solution having an increased concentration of the polymer and refluxing the stream to the separator 200, and supplying a residue stream including a remainder of the lower discharge stream from the separator 200 to the stripping process unit 300, and a vapor mass fraction of the divergence stream after being heated by a heat exchanger 220 and before passing through a pressure adjustment valve 230 was adjusted to 0 wt % using the pressure adjustment valve 230. Here, the amount of steam supplied to the heat exchanger 220 was 0.3 tons, an amount of a further volatilized solvent was 2.2 tons, and a concentration of a polymer solution having an increased polymer concentration was 25.0 wt %.

Then, the residue stream including the polymer solution having an increased polymer concentration was transferred to the steam stripping process unit 300 to recover steam and the solvent as a gas phase by direct steam contact to obtain a solid-phase polymer. Here, the amount of steam used in the steam stripping process unit 300 was 12.0 tons. Then, the solid-phase polymer was introduced to a dryer (not shown) in a manufacturing process together with circulation water (water) present for transferring the solid-phase polymer in the steam stripping process unit 300 to discharge a residual solvent and moisture as a waste gas and discard them, and a final solid-phase polymer product was obtained. Here, the residual solvent in the solid-phase polymer introduced to the dryer (not shown) in the manufacturing process was 0.5 wt %.

Example 2

A process was carried out in the same manner as in Example 1, except that 0.9 tons of steam was supplied to the heat exchanger 220.

Example 3

A process was carried out in the same manner as in Example 1, except that 1.3 tons of steam was supplied to the heat exchanger 220.

Example 4

A process was carried out in the same manner as in Example 1, except that 1.7 tons of steam was supplied to the heat exchanger 220.

Example 5

A process was carried out in the same manner as in Example 1, except that 1.9 tons of steam was supplied to the heat exchanger 220.

Example 6

A process was carried out in the same manner as in Example 3, except that a divergence stream included 90% of the lower discharge stream from the separator 200 was heated by the heat exchanger 220, and was refluxed to the separator.

Example 7

A process was carried out in the same manner as in Example 4, except that a divergence stream included 90% of the lower discharge stream from the separator 200 was heated by the heat exchanger 220, and was refluxed to the separator.

Example 8

A process was carried out in the same manner as in Example 5, except that a divergence stream included 90% of the lower discharge stream from the separator 200 was heated by the heat exchanger 220, and was refluxed to the separator.

Example 9

A process was carried out in the same manner as in Example 3, except that a divergence stream included 95% of the lower discharge stream from the separator 200 was heated by the heat exchanger 220, and was refluxed to the separator.

Example 10

A process was carried out in the same manner as in Example 4, except that a divergence stream included 95% of the lower discharge stream from the separator 200 was heated by the heat exchanger 220, and was refluxed to the separator.

Example 11

A process was carried out in the same manner as in Example 5, except that a divergence stream included 95% of the lower discharge stream from the separator 200 was heated by the heat exchanger 220, and was refluxed to the separator.

Comparative Example 1

As shown in the process flow chart illustrated in FIG. 2, a styrene monomer, a butadiene monomer, cyclohexane as a solvent, and n-butyllithium as an initiator were supplied to a reactor 100 including a stirrer and a jacket and were polymerized to obtain a polymer solution in which polymerization was completed. Here, a polymer concentration in the polymer solution was 20 wt % (5 tons of a polymer and 20 tons of the solvent). Then, a blow down tank (not shown) was supplied with a stream including the polymer solution from the reactor 100 to recover a part of the solvent as a gas phase under a reduced pressure using residual heat remaining the polymer solution and discharge the polymer solution from which the solvent was partly removed. Here, an amount of the part of the solvent recovered as a gas phase was 2.8 tons and a concentration of the polymer solution, from which the solvent was partly removed, was 22.5 wt %. Then, the stream including the polymer solution, from which the solvent was partly removed, was transferred from the blow down tank (not shown) to the steam stripping process unit 300 to recover steam and the solvent as a gas phase by direct steam contact and obtain a solid-phase polymer. Here, the amount of steam used in the steam stripping process unit 300 was 13.8 tons. Then, the solid-phase polymer was introduced to a dryer (not shown) in a manufacturing process together with circulation water (water) present for transferring the solid-phase polymer in the steam stripping process unit to discharge a residual solvent and moisture as a waste gas and discard them, and a final solid-phase polymer product was obtained. Here, the residual solvent in the solid-phase polymer introduced to the dryer (not shown) was 0.5 wt %.

Comparative Example 2

As shown in the process flow chart illustrated in FIG. 3, a styrene monomer, a butadiene monomer, cyclohexane as a solvent, and n-butyllithium as an initiator were supplied to a reactor 100 including a stirrer and a jacket and were polymerized to obtain a polymer solution in which polymerization was completed. Here, a polymer concentration in the polymer solution was 20 wt % (5 tons of a polymer and 20 tons of the solvent). Then, a blow down tank (not shown) was supplied with a stream including the polymer solution from the reactor 100 to recover a part of the solvent as a gas phase under a reduced pressure using residual heat remaining the polymer solution and discharge the polymer solution from which the solvent was partly removed. Here, an amount of the part of the solvent recovered as a gas phase was 2.8 tons and a concentration of the polymer solution, from which the solvent was partly removed, was 22.5 wt %. Then, the stream including the polymer solution, from which the solvent was partly removed, was transferred from the blow down tank (not shown) to a separator 200 connected by a pump (not shown) in a discharge line to further volatilize the solvent to obtain the polymer solution having an increased polymer concentration. Here, further volatilization of the solvent in the separator 200 was performed by heating a divergence stream including 80% of a lower discharge stream from the separator 200 including the polymer solution having an increased concentration of the polymer and refluxing the stream to the separator 200, and supplying a residue stream including a remainder of the lower discharge stream from the separator 200 to the stripping process unit 300. Here, the amount of steam supplied to the heat exchanger 220 was 0.3 tons, an amount of the further volatilized solvent was 2.2 tons, a concentration of the polymer solution having an increased polymer concentration was 2.5 wt %, and a vapor mass fraction of the divergence stream heated by the heat exchanger 220 and then refluxed to the separator 200 was 7 wt %.

Unlike the Examples, the vapor mass fraction of the divergence stream was not adjusted by a pressure adjustment valve, and fouling, which is a blockage phenomenon of the heat exchanger due to polymer accumulation, occurred during a vaporization phenomenon of the solvent in the divergence stream heated by the heat exchanger 220 and then refluxed, thereby shutting down operation of the solvent recovery apparatus.

Experimental Examples

In the process of preparing a polymer in Examples 1 to 11 and Comparative Example 1, heat quantity (A), an amount of steam (B), and a discharge temperature (C) used in the heat exchanger 220, a concentration of the polymer (D) and an amount of steam (E) transferred to the steam stripping process unit 300, a sum of steam (F) used in the process, an amount of the residual solvent (G) in the solid-phase polymer and a color (H) of the final solid-phase polymer product, and determination of whether there was a fouling phenomenon (I) in the apparatus were measured and are shown in the following Table 1.

the fouling occurred, heat exchange efficiency was decreased, thereby shutting down the process operation and deteriorating economic feasibility.

In addition, it was confirmed that when the temperature of the stream heated by the heat exchanger 220 and discharged was higher than 110° C. (Examples 4 and 5), a color change of the finally obtained solid-phase polymer occurred.

In addition, it was confirmed that as in Examples 9 to 11, when a divergence stream including 95% of the lower discharge stream from the separator 200 diverged was heated by the heat exchanger 220, and then refluxed to the separator, an excessive amount of stream was introduced and discharged from the separator 200, thereby causing a fouling phenomenon in the piping due to flow rate instability and a differential pressure increase.

The invention claimed is:

1. A method of recovering a solvent, the method comprising:
    supplying polymerization reactants including one or more monomers and a solvent to a reactor to obtain a polymer solution;
    supplying a stream including the polymer solution to a separator to separate an upper discharge stream including the solvent, wherein the solvent is in a gaseous phase, and a lower discharge stream including the polymer solution; and
    heating a divergence stream including a part of the lower discharge stream from the separator with a heating device and refluxing the divergence stream to the separator;
    supplying a residue stream including a remainder of the lower discharge stream from the separator to a steam stripping process unit; and
    adjusting a vapor mass fraction of the divergence stream refluxed to the separator with a pressure adjustment valve after being heated by the heating device.

2. The method of recovering a solvent of claim 1, wherein the one or more monomers include styrene and butadiene.

3. The method of recovering a solvent of claim 1, further comprising: before supplying the stream including the polymer solution to the separator, supplying the polymer solution to a blow down tank and discharging a part of the solvent from the blow down tank in a gaseous phase using a residual heat of the polymerization reaction.

TABLE 1

| | Heat exchanger | | | Steam stripping | | Steam | Product | | Fouling |
|---|---|---|---|---|---|---|---|---|---|
| | A | B | C | D | E | F | G | H | I |
| | | | | | | Unit | | | |
| | Gcal | Ton | ° C. | wt % | Ton | Ton | wt % | Visual color | — |
| Example 1 | 0.17 | 0.3 | 86.9 | 25.0 | 12.0 | 12.3 | 0.5 | White | No |
| Example 2 | 0.46 | 0.9 | 96.3 | 29.9 | 9.4 | 10.3 | 0.5 | White | No |
| Example 3 | 0.67 | 1.3 | 106 | 35.0 | 7.4 | 8.8 | 0.5 | White | No |
| Example 4 | 0.83 | 1.7 | 115.5 | 39.9 | 6.0 | 7.7 | 0.5 | Light yellow | No |
| Example 5 | 0.95 | 1.9 | 125.2 | 45.0 | 4.9 | 6.8 | 0.5 | Light yellow | Yes |
| Example 6 | 0.67 | 1.3 | 93.5 | 35.0 | 7.4 | 8.8 | 0.5 | White | No |
| Example 7 | 0.83 | 1.7 | 98.2 | 39.9 | 6.0 | 7.7 | 0.5 | White | No |
| Example 8 | 0.95 | 1.9 | 103.1 | 45.0 | 4.9 | 6.8 | 0.5 | White | Yes |
| Example 9 | 0.67 | 1.3 | 88.2 | 35.0 | 7.4 | 8.8 | 0.5 | White | Yes |
| Example 10 | 0.83 | 1.7 | 90.8 | 40.0 | 6.0 | 7.7 | 0.5 | White | Yes |
| Example 11 | 0.95 | 1.9 | 93.5 | 45.0 | 4.9 | 6.8 | 0.5 | White | Yes |
| Comparative Example 1 | 0.00 | 0.0 | — | 22.5 | 13.8 | 13.8 | 0.5 | White | No |

Referring to Table 1, it was confirmed that as the concentration (wt %) of the polymer in the polymer solution transferred to the steam stripping process unit 300 increases, the amount of steam used in the steam stripping process unit 300 decreases, thereby decreasing the amount of total steam used in the process.

In addition, it was confirmed that when the concentration of the polymer introduced to the steam stripping process unit 300 was more than 40 wt % (Examples 5 and 8), fouling occurred in the heat exchanger 220 and the pump 210 and piping circulated to the heat exchanger 220. As such, when 4. The method of recovering a solvent of claim 1, further comprising: after supplying the residue stream of the separator to the steam stripping process unit, volatilizing the solvent from the residue stream to obtain a solid-phase polymer.

5. The method of recovering a solvent of claim 1, wherein the divergence stream of the separator is heated by passing the divergence stream through a heat exchanger.

6. The method of recovering a solvent of claim 1, wherein a flow rate ratio of the divergence stream to a total flow rate of the lower discharge stream is 80% to 90%.

7. The method of recovering a solvent of claim 1, wherein a polymer concentration of the polymer solution in the residue stream of the separator is 20 wt % to 40 wt %.

8. The method of recovering a solvent of claim 1, wherein a viscosity of the polymer solution in the residue stream of the separator is 1,000 cp to 10,000 cp.

9. The method of recovering a solvent of claim 1, wherein the vapor mass fraction of the divergence stream after the divergence stream is heated by the heating device and before the divergence stream passes through the pressure adjustment valve is 0 wt % to 2 wt %.

10. The method of recovering a solvent of claim 1, wherein a temperature of the divergence stream refluxed to the separator is 80° C. to 110° C.

11. A solvent recovery apparatus comprising:
a reactor supplied with polymerization reactants including one or more monomers and a solvent, wherein the reactor discharges a stream including a polymer solution obtained by polymerization of the polymerization reactants;
a separator supplied with the stream discharged from the reactor, wherein the separator discharges an upper discharge stream including the solvent, wherein the solvent is in a gaseous phase, and a lower discharge stream including the polymer solution;
a heating device, which heats a divergence stream comprising a part of the lower discharge stream to reflux the divergence stream to the separator;
a pressure adjustment valve, which adjusts a vapor mass fraction of the divergence stream refluxed to the separator after being heated by the heating device; and
a steam stripping process unit supplied with a residue stream including a remainder of the lower discharge stream from the separator, which volatilizes the solvent in the polymer solution.

12. The solvent recovery apparatus of claim 11, further comprising: a blow down tank supplied with the discharge stream from the reactor, wherein the blow down tank discharges a part of the solvent from the blow down tank in a gaseous phase using residual heat of the polymerization reaction, and discharges a lower discharge stream including the polymer solution including a remainder of the solvent to the separator.

* * * * *